(12) United States Patent
Wang

(10) Patent No.: US 8,015,666 B2
(45) Date of Patent: Sep. 13, 2011

(54) MAGNETIC HINGE ASSEMBLY

(75) Inventor: Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 301 days.

(21) Appl. No.: 12/347,533

(22) Filed: Dec. 31, 2008

(65) Prior Publication Data
US 2010/0058557 A1 Mar. 11, 2010

(30) Foreign Application Priority Data

Sep. 10, 2008 (CN) .......................... 2008 1 0304440

(51) Int. Cl.
*E05D 11/10* (2006.01)
(52) U.S. Cl. .......................................... 16/320; 16/337
(58) Field of Classification Search .................. 16/320, 16/385, 386, 342, 337, 338, 340, DIG. 14; 292/251.5, 288, 338, 339, 342, 343, DIG. 17; 455/550.1, 557.1, 575.3; 379/433.13
See application file for complete search history.

(56) References Cited

U.S. PATENT DOCUMENTS

| 3,287,760 | A  | * | 11/1966 | Moore .............................. 16/265 |
| 6,408,484 | B1 | * | 6/2002  | Vandertouw ..................... 16/320 |
| 2002/0147026 | A1 | * | 10/2002 | Hsieh .............................. 455/550 |
| 2003/0154571 | A1 | * | 8/2003 | Hsiang et al. .................... 16/320 |
| 2003/0179880 | A1 | * | 9/2003 | Pan et al. .................. 379/433.13 |
| 2004/0134030 | A1 | * | 7/2004 | Seidler ............................ 16/320 |
| 2007/0077972 | A1 | * | 4/2007 | Tu et al. ..................... 455/575.3 |
| 2007/0157432 | A1 | * | 7/2007 | Weinstein ....................... 16/320 |
| 2009/0167472 | A1 | * | 7/2009 | Lu ................................ 335/287 |

FOREIGN PATENT DOCUMENTS

JP 2006112523 A * 4/2006

* cited by examiner

*Primary Examiner* — Chuck Y. Mah
(74) *Attorney, Agent, or Firm* — Altis Law Group, Inc.

(57) ABSTRACT

A hinge assembly includes a pivot shaft, a fixing module, a rotatable module, and a fixing member. The pivot shaft includes a first end and a second end opposite to the first end. The fixing module is non-rotatably sleeved on the pivot shaft adjacent to the first end and includes a first magnet. The rotatable module is rotatably sleeved on the pivot shaft adjacent to the second end and includes a second magnet. A polarity of the second magnet faces an opposite polarity of the first magnet such that the first and second magnets creating an attracting force. The rotatable module is pushed to tightly contact the fixing module by the attracting force such that a friction is created between the rotatable module and the fixing module to hold the rotatable module. The fixing member is fixed at the second end of the pivot shaft.

18 Claims, 7 Drawing Sheets

MAGNETIC HINGE ASSEMBLY

BACKGROUND

1. Field of the Invention

The present disclosure generally relates to hinge assemblies and, particularly, to a magnetic hinge assembly used in a foldable electronic device having a top cover and a main body.

2. Description of the Related Art

Foldable electronic devices, such as notebook computers, are popular for their portability. In the foldable electronic device, a cover is rotatably connected to a main body via a hinge assembly. A typical hinge assembly may be a magnetic hinge assembly.

The typical magnetic hinge assembly includes a housing fixed in the main body, a pivot shaft fixed to the cover, a first magnet, and a movable second magnet. The housing defines a chamber. The pivot shaft is rotatably received in the chamber. The first magnet is fixed in the chamber. The second magnet is rotatably received in the chamber and sleeved on the pivot shaft. A polarity of the second magnet faces an opposite polarity of the first magnet such that the first magnet attracts the first magnet. Thus, the typical hinge assembly includes two stable positions. In a first stable position, a first polarity of the second magnet faces a first side of the first magnet, and the first side has a polarity opposite to the first polarity. In a second stable position, a second polarity of the second magnet faces a second side of the first magnet, and the second side has a polarity opposite to the second polarity.

To adjust a desired view angle of a display positioned in the cover, the cover generally needs to be opened to any angle relative to the main body, and remain in any position. However, the typical hinge assembly only includes two stable positions, so the cover only can be opened to two stable positions relative to the main body, and cannot remain in any other position.

Therefore, a new magnetic hinge assembly is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

The present magnetic hinge assembly may be used in foldable electronic devices, such as notebook computers, foldable mobile phones, media players, and so on.

Figure 1:
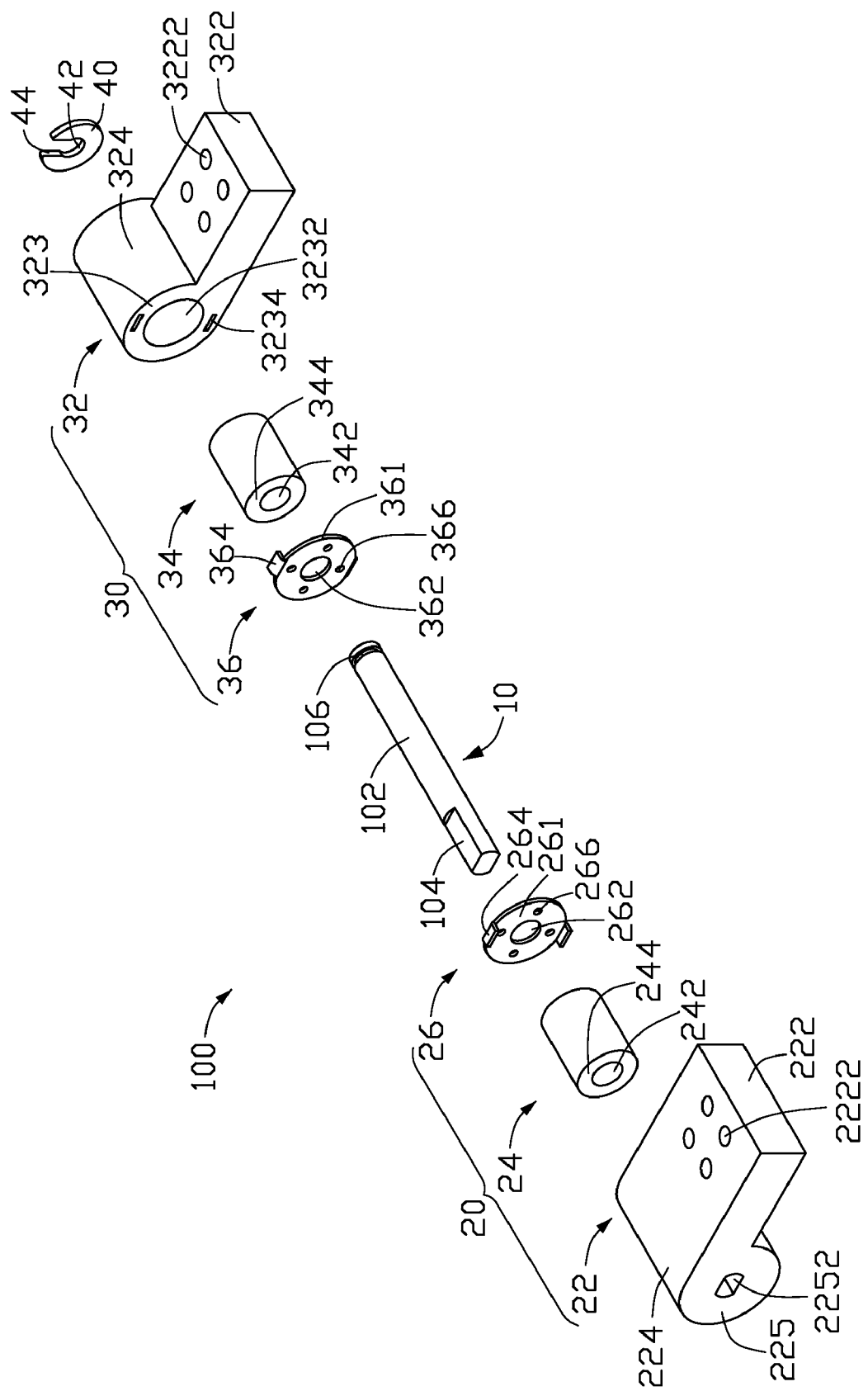
FIG. 1 is an exploded, isometric view of a first embodiment of a magnetic hinge assembly.
Figure 2:
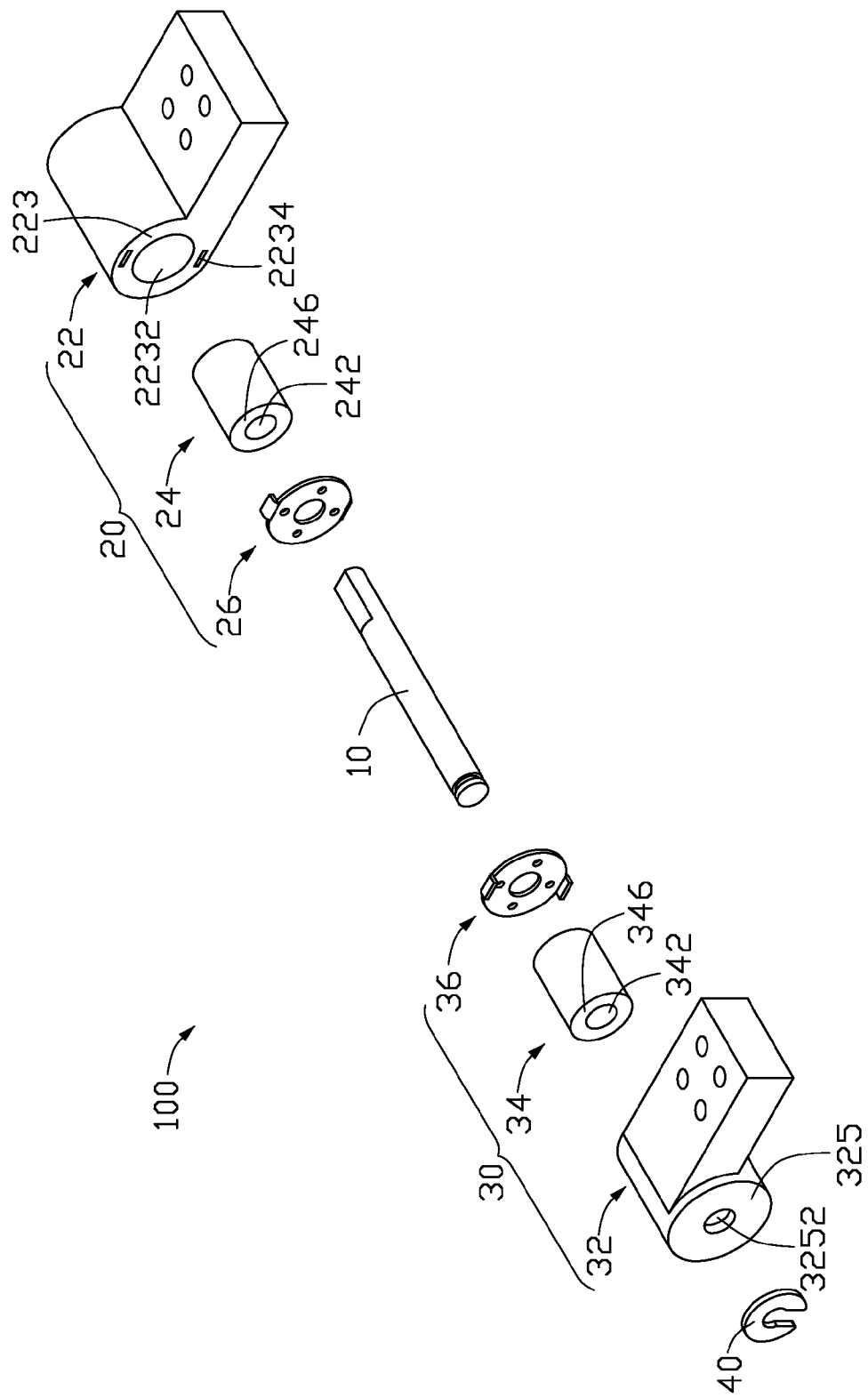
FIG. 2 is similar to FIG. 1, but viewed from another aspect.
Figure 3:
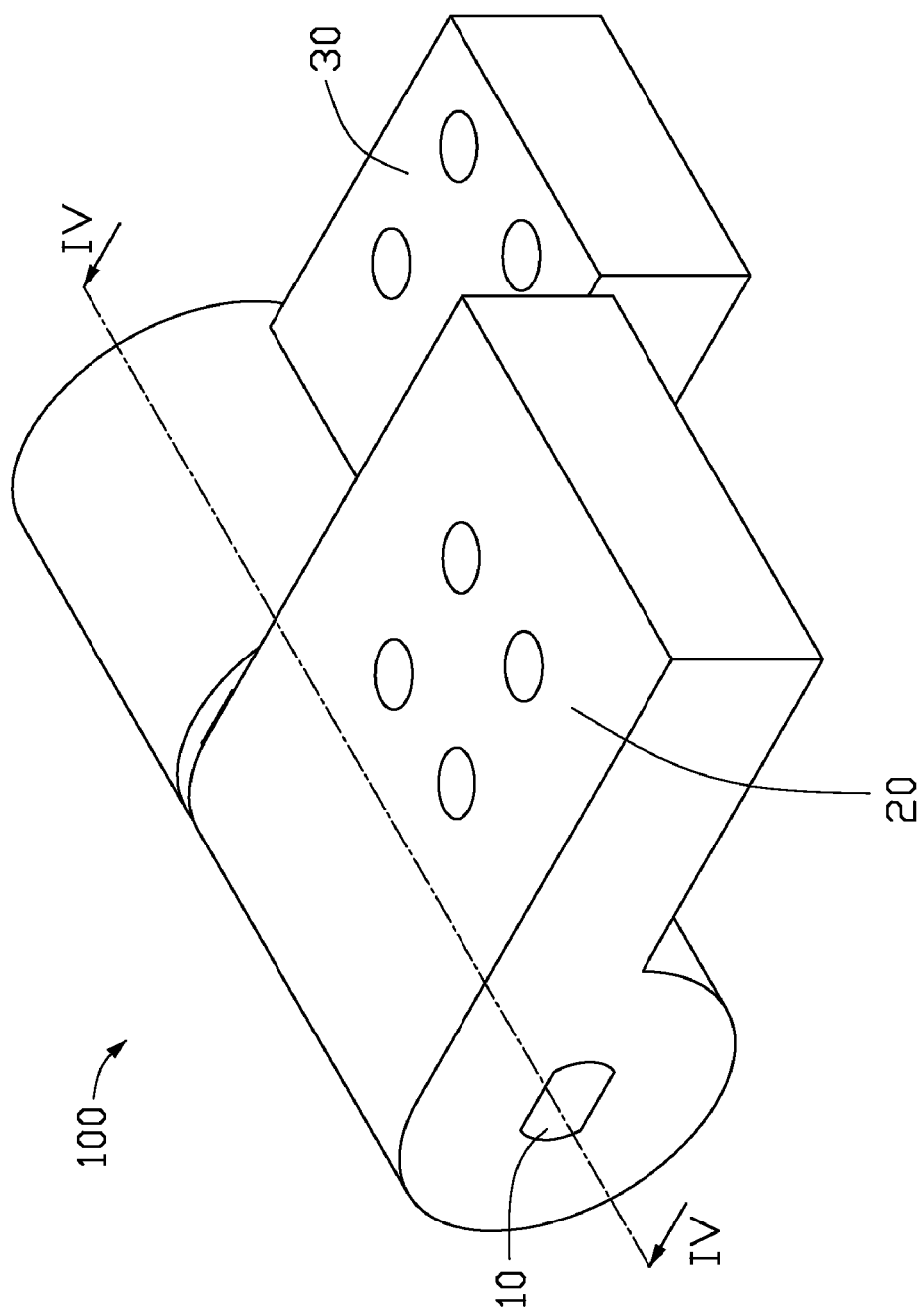
FIG. 3 is an assembled, isometric view of the magnetic hinge assembly of FIG. 1.
Figure 4:
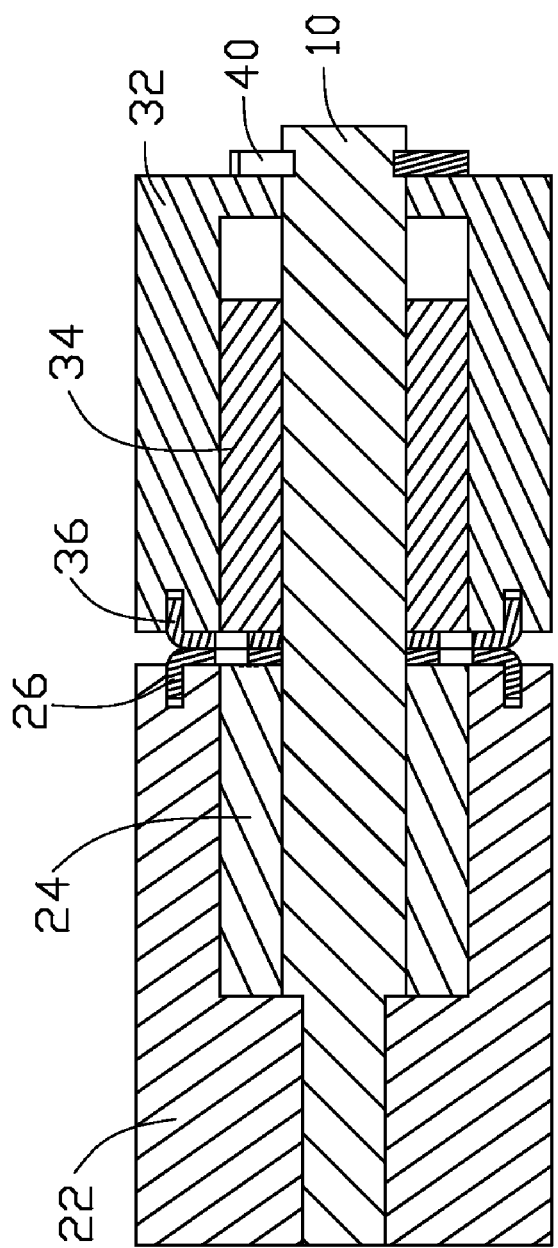
FIG. 4 is a cross-sectional view of the magnetic hinge assembly of FIG. 3, taken along line IV-IV.

Referring to FIGS. 1 and 2, a first embodiment of a magnetic hinge assembly 100 includes a pivot shaft 10, a fixing module 20, a rotatable module 30, and a fixing member 40. The fixing module 20 is non-rotatably sleeved on the pivot shaft 10. The rotatable module 30 is rotatably sleeved on the pivot shaft 10. The fixing member 40 is fixed at an end of the pivot shaft 10.

The pivot shaft 10 includes a shaft portion 102 and a limiting portion 104 extending from a first end of the shaft portion 102, and defines a latching groove 106 around a second end of the shaft portion 102 opposite to the first end.

The fixing module 20 includes a fixing member 22, a first magnet 24, and a first friction member 26. The first magnet 24 is sleeved on the pivot shaft 10 and fixed in the fixing member 22. The first friction member 26 is sleeved on the pivot shaft 10 and connected to the fixing member 22.

The fixing member 22 includes a fixing portion 222 and a connecting portion 224 extending from an end of the fixing portion 222. The fixing portion 222 defines a plurality of mounting holes 2222 to securely attach the fixing member 22 to a main body of a foldable electronic device (not shown). The connecting portion 224 is substantially cylindrically shaped, and includes a connecting surface 223 and a resisting surface 225 opposite to the connecting surface 223. The connecting surface 223 corresponds to the first friction member 26. The fixing member 22 defines a receiving hole 2232 through a middle portion of the connecting surface 223 and two fixing grooves 2234 in the connecting surface 223 adjacent to the receiving hole 2232. The receiving hole 2232 extends into the connecting portion 224 and has a size corresponding to the first magnet 24 such that the first magnet 24 is received in the receiving hole 2232. The resisting surface 225 defines a non-circular engaging hole 2252. The engaging hole 2252 extends into the connecting portion 224 and communicates with the receiving hole 2232. The engaging hole 2252 is configured to tightly engage with the limiting portion 104 of the pivot shaft 10, thereby preventing the fixing member 22 from detaching from the pivot shaft 10.

The first magnet 24 is substantially cylindrically shaped and defines a substantially circular through hole 242 extending through a central axis of the first magnet 24. The first magnet 24 is sleeved on the pivot shaft 10 via the through hole 242. The first magnet 24 includes a first end surface 244 and a second end surface 246 on another side of the first magnet 24 opposite to the first end surface 244. The first end surface 244 has a first polarity such as a south polarity and the second end surface 246 has a second polarity such as a north polarity opposite to the first polarity. The first magnet 24 may be a permanent magnet or an electromagnet. In the illustrated embodiment, the first magnet 24 is a permanent magnet.

The first friction member 26 may be a tab washer including a substantially circular main portion 261 and defines a substantially circular pivot hole 262 through a middle portion of the main portion 261. Two tabs 264 are formed at an edge of the main portion 261, and extend along a direction substantially perpendicular to the main portion 261. Each of the tabs 264 has a shape and size corresponding to a corresponding one of the fixing grooves 2234 of the fixing member 22 so that the first friction member 26 is fixed to the fixing member 22. The first friction member 26 also defines a plurality of evenly spaced oil holes 266 around the pivot hole 262. The oil holes 266 may receive lubricants. In the illustrated embodiment, the first friction member 26 is made of high carbon steel which has good magneto-conductivity.

The rotatable module 30 includes a rotatable member 32, a second magnet 34, and a second friction member 36. The first magnet 34 is sleeved on the pivot shaft 10 and received in the fixing member 32. The first friction member 36 is sleeved on the pivot shaft 10 and connected to the rotatable member 32.

The rotatable member 32 is similar in principle to the fixing member 22. The rotatable member 32 includes a fixing portion 322 and a connecting portion 324 extending from an end of the fixing portion 322. The fixing portion 322 defines a plurality of mounting holes 3222 to securely attach the rotatable member 32 to a top cover of the foldable electronic device. The connecting portion 324 is substantially cylindrically shaped and includes a connecting surface 323 and a resisting surface 325 opposite to the connecting surface 323. The connecting surface 323 corresponds to the second friction member 36. The rotatable member 32 defines a receiving hole 3232 through a middle portion of the connecting surface 323 and two fixing grooves 3234 in the connecting surface 323 adjacent to the receiving hole 3232. The receiving hole 3232 has a size corresponding to the second magnet 34 such that the second magnet 34 is received in the receiving hole 3232. The resisting surface 325 defines a substantially circular pivot hole 3252. The pivot hole 3252 extends into the connecting portion 324 and communicates with the receiving hole 3232.

The second magnet 34 is substantially cylindrically shaped and defines a substantially circular through hole 342 extending through a central axis of the second magnet 34. The second magnet 34 is sleeved on the pivot shaft 10 via the through hole 342. The second magnet 34 includes a first end surface 344 and a second end surface 346 on another side of the second magnet 34 opposite to the first end surface 344. The first end surface 344 has a first polarity such as south polarity and the second end surface 346 has a second polarity such as north polarity opposite to the first polarity. The first magnet 34 may be a permanent magnet or an electromagnet. In the illustrated embodiment the first magnet 34 is a permanent magnet.

The second friction member 36 may be a tab washer including a substantially circular main portion 361 and defines a substantially circular pivot hole 362 through the middle portion of the main portion 361. Two tabs 364 are formed at an edge of the main portion 361, and extend along a direction substantially perpendicular to the main portion 361. Each of the tabs 364 has a shape and size corresponding to a corresponding one of the fixing grooves 3234 of the rotatable member 32 so that the second friction member 36 is fixed to the rotatable member 32. The second friction member 36 also defines a plurality of evenly spaced oil holes 366 around the pivot hole 362. The oil holes 366 may receive lubricants. In the illustrated embodiment, the first friction member 36 is made of high carbon steel which has good magneto-conductivity.

The fixing member 40 may be a C-shaped snap ring. The fixing member 40 defines a substantially circular hole 42 and a notch 44 communicating with the circular hole 42. The fixing member 40 is configured to be latched in the latching groove 106 of the pivot shaft 10.

Referring to FIGS. 1 through 4, the first magnet 24 is received in the receiving hole 2232 of the fixing member 22 and the tabs 264 of the first friction member 26 are inserted into the fixing grooves 2234 of the fixing member 22, thereby fixing the first magnet 24 in the receiving hole 2232. Thus, the fixing module 20 is assembled. The rotatable module 30 is similarly assembled. The fixing module 20 is sleeved on the pivot shaft 10 adjacent to the first end of the shaft portion 102, with the limiting portion of the pivot shaft 10 tightly engaging in the engaging hole 2252 of the fixing member 22 so that the fixing member 22 is non-rotatable relative to the pivot shaft 10. The rotatable module 30 is sleeved on the pivot shaft 10 adjacent to the second end of the shaft portion 102, with the first polarity of the second magnet 34 facing the second polarity of the first magnet 24. That is, a polarity of the second magnet 34 faces an opposite polarity of the magnet 24 such that the first and second magnets 24, 34 attract each other. The fixing member 40 is latched in the latching groove 106 of the pivot shaft 10 to prevent the rotatable module 30 from detaching from the pivot shaft 10.

Figure 5:
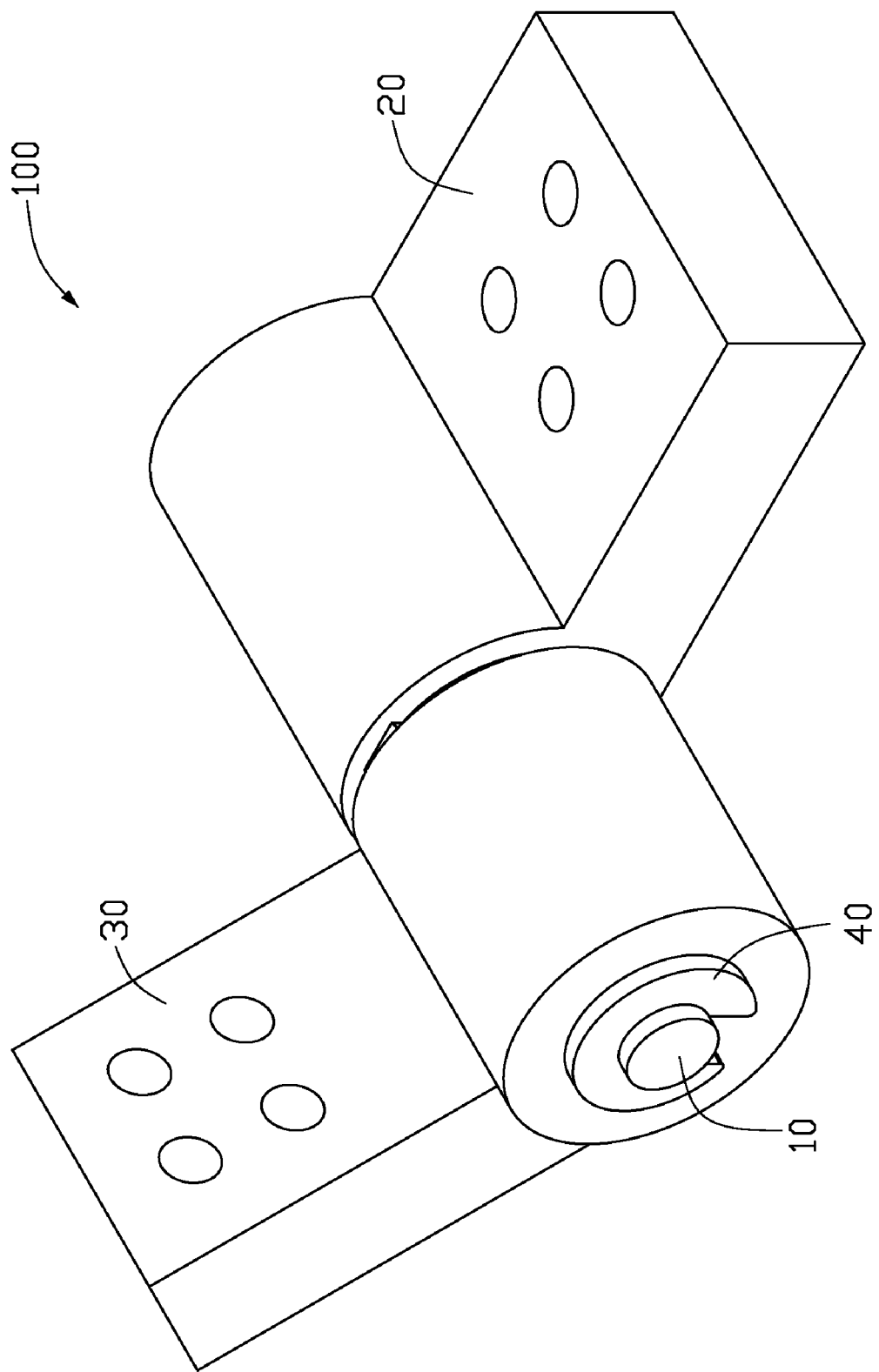
FIG. 5 is similar to FIG. 3, but showing an open state of the hinge assembly of FIG. 3.

Referring also to FIG. 5, in use, an external force is applied to rotate the rotatable member 32 together with the second friction member 36 relative to the fixing member 22. The first and second magnets 24, 34 attract each other because one of the first and second polarities of the second magnet 34 faces an opposite polarity of the first magnet 24. An attracting force created by the first and second magnets 24, 34 pushes the first and second friction members 26, 36 to tightly contact each other, thereby creating a friction between the first and second friction members 26, 36. The rotatable member 32 can be held in any position relative to the fixing member 22 by the friction. Therefore, when the rotatable member 32 is fixed to the cover of foldable electronic device and the fixing member 22 is fixed to the main body of the foldable electronic device, the cover may be opened to any angle relative to the main body and remain in any position.

Figure 6:
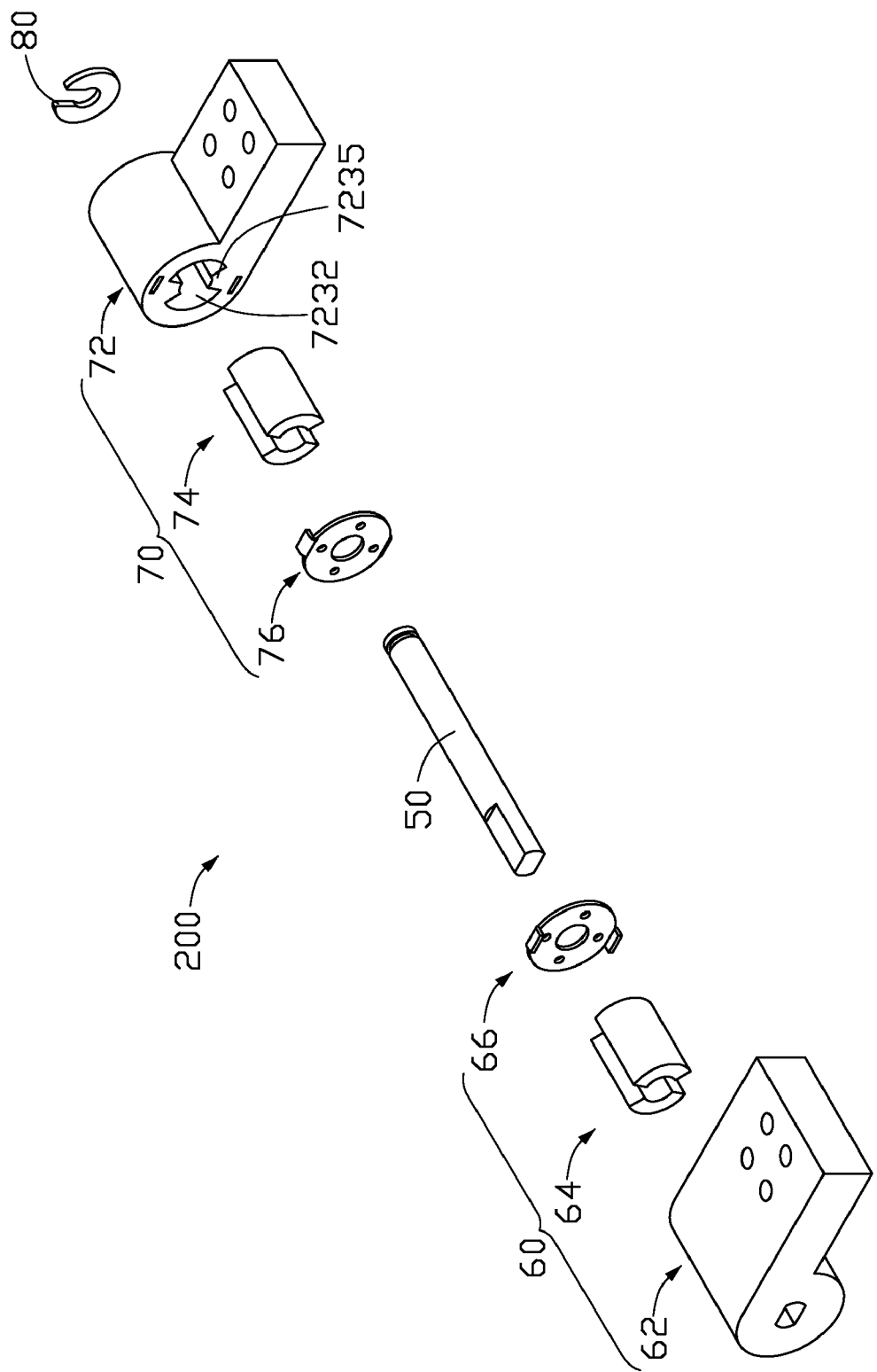
FIG. 6 is an exploded, isometric view of a second embodiment of a magnetic hinge assembly.
Figure 7:
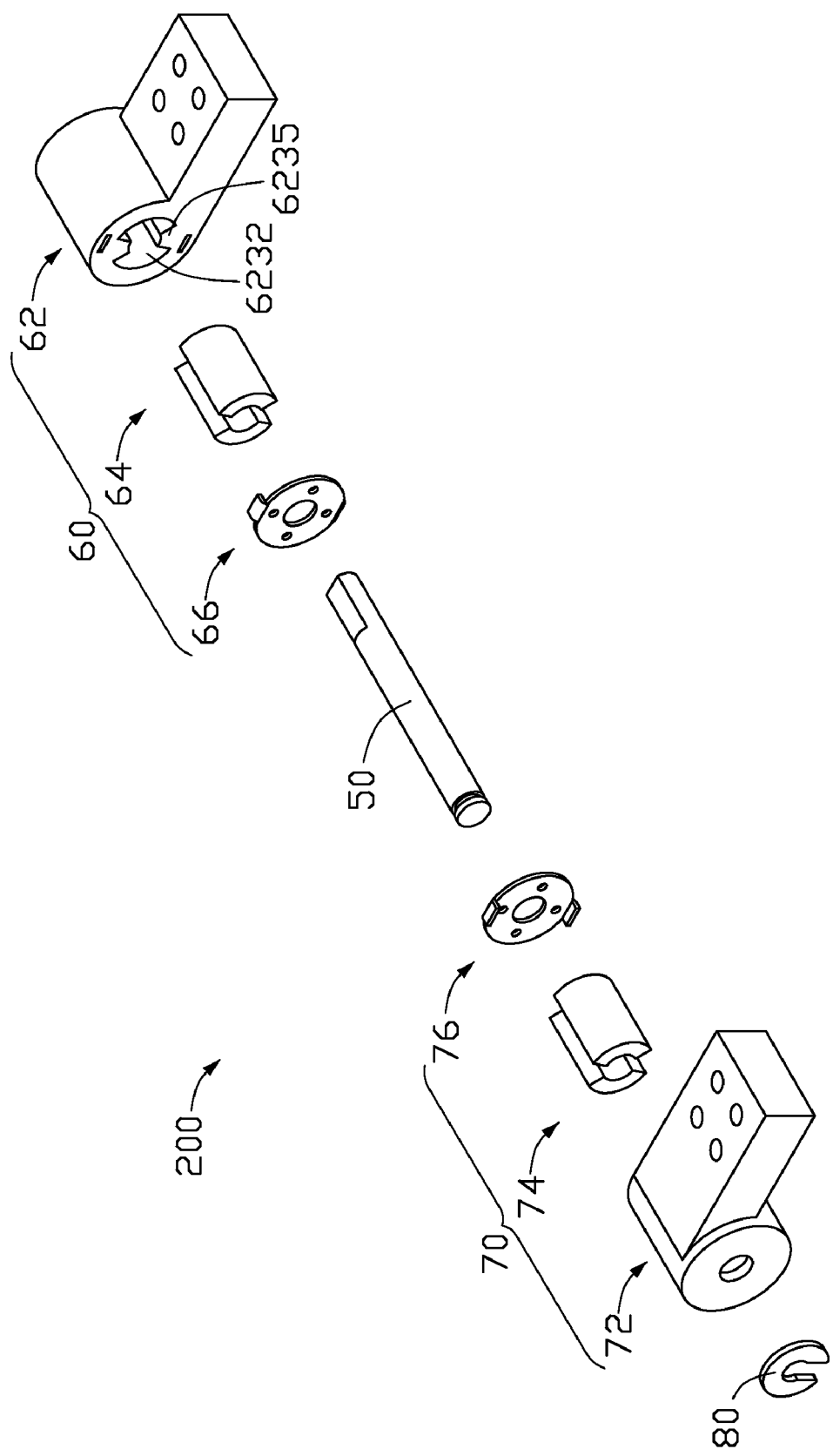
FIG. 7 is similar to FIG. 6, but viewed from another aspect.

Referring to FIGS. 6 and 7, a second embodiment of a magnetic hinge assembly 200 is similar in principle to the first embodiment of the magnetic hinge assembly 100. The magnetic hinge assembly 200 includes a pivot shaft 50, a fixing module 60, a rotatable module 70, and a fixing member 80. The fixing module 60 is non-rotatably sleeved on the pivot shaft 50. The rotatable module 70 is rotatably sleeved on the pivot shaft 50. The fixing member 80 is fixed at an end of the pivot shaft 50. The fixing module 60 includes a fixing member 62 defining a receiving hole 6232. The rotatable module 70 includes a rotatable member 72 defining a receiving hole 7232. However, the fixing module 60 includes a pair of first magnets 64, and the rotatable module 70 includes a pair of second magnets 74. Two latching protrusions 6235 are formed in an inner surface of the receiving hole 6232 to latch the first magnets 64 in the receiving hole 6232. Two latching protrusions 7235 are formed in an inner surface of the receiving hole 7232 to latch the second magnets 74 in the receiving hole 7232.

It may be appreciated that the first friction members 26, 36 and the second friction members 36, 76 may be made of other materials which have good magneto-conductivity. In addition, the first friction members 26,36 and the second friction members 36, 76 may be made of materials that do not have magneto-conductivity. However, a magnetic field created by the first magnets 24, 64 and the second magnets 34,74 should be capable of passing through the first friction member 26,36 and the second friction member 36, 76.

In alternative embodiments, the first friction members 26, 66 and the second friction members 36, 76 are omitted, but the first magnets 24, 64 directly abut the second magnets 34, 74, or the fixing members 22,62 directly abut the rotatable members 32, 72. In addition, a resisting surface of each of the first friction members 26, 36 and the second friction members 36, 76 may be a slanted surface.

It may be appreciated that a number of the first magnets 24, 64 or the second magnets 34, 74 may be more than two. Each of the first magnets 24, 64 and the second magnets 34, 74 may include a latching portion and each of the fixing members 22, 62 and the rotatable members 32, 72 defines a latching groove. The first magnets 24, 64 and the second magnets 34, 74 are respectively fixed in the fixing members 22, 62 and the rotatable members 32, 72 when each latching portion is latched in the corresponding latching groove. In addition, each of the fixing members 40, 80 may be a nut and each of the pivot shafts 10, 50 includes a threaded portion to engage with the nut.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
   a pivot shaft comprising a first end and a second end opposite to the first end;
   a fixing module non-rotatably sleeved on the pivot shaft adjacent to the first end, comprising a first magnet and a first friction member sleeved on the pivot shaft;
   a rotatable module rotatably sleeved on the pivot shaft adjacent to the second end, the rotatable module comprising a second magnet and a second friction member sleeved on the pivot shaft and abutting the first friction member, wherein a polarity of the second magnet faces an opposite polarity of the first magnet such that the first and second magnets create an attracting force, and the rotatable module is pushed to tightly contact the fixing module by the attracting force such that a friction is created between the rotatable module and the fixing module to hold the rotatable module; and
   a fixing member fixed at the second end of the pivot shaft to prevent the rotatable module from detaching from the pivot shaft.

2. The hinge assembly of claim 1, wherein the fixing module further comprises a fixing member non-rotatably sleeved on the pivot shaft; the first magnet is fixed in the fixing member.

3. The hinge assembly of claim 2, wherein the fixing member comprises a connecting portion having a connecting surface abutting the first friction member; the fixing member defines a receiving hole through the connecting surface and two fixing grooves in the connecting surface adjacent to the receiving hole, the receiving hole extends into the connecting portion; the first magnet is received in the receiving hole; the first friction member is a tab washer including a main portion and two tabs formed at an edge of the main portion; the tabs are received in the fixing grooves of the fixing member so that the first friction member is fixed to the fixing member.

4. The hinge assembly of claim 3, wherein the connecting portion further comprises a resisting surface opposite to the connecting surface; the resisting surface defines a non-circular engaging hole extending into the connecting portion and communicating with the receiving hole; the pivot shaft comprises a limiting portion adjacent to the first end; the limiting portion tightly engages in the engaging hole to prevent the fixing member from detaching from the pivot shaft.

5. The hinge assembly of claim 1, wherein the rotatable module further comprises a rotatable member rotatably sleeved on the pivot shaft; the second magnet is fixed in the rotatable member.

6. The hinge assembly of claim 5, wherein the rotatable member comprises a connecting portion having a connecting surface abutting the second friction member; the rotatable member defines a receiving hole through the connecting surface and two fixing grooves in the connecting surface adjacent to the receiving hole; the receiving hole extends into the connecting portion; the second magnet is received in the receiving hole; the second friction member is a tab washer including a main portion and two tabs formed at an edge of the main portion; the tabs are received in the fixing grooves of the rotatable member so that the second friction member is fixed to the rotatable member.

7. The hinge assembly of claim 6, wherein the connecting portion further comprises a resisting surface opposite to the connecting surface; the resisting surface defines a substantially circular engaging hole extending into the connecting portion and communicating with the receiving hole; the second end of the pivot shaft rotatably extends through the engaging hole.

8. The hinge assembly of claim 7, wherein the pivot shaft defines a latching groove around the second end of the pivot shaft, and the fixing member is a C-shaped snap ring latched in the latching groove.

9. The hinge assembly of claim 1, wherein the first and second friction members are made of high carbon steel.

10. The hinge assembly of claim 1, wherein the first and second magnets are both permanent magnets.

11. A hinge assembly, comprising:
    a pivot shaft comprising a first end and a second end opposite to the first end;
    a fixing module comprising a fixing member fixedly sleeved on the pivot shaft adjacent to the first end, a pair of first magnets fixed in the fixing member, and a first friction member sleeved on the pivot shaft and connected to the fixing member;
    a rotatable module comprising a rotatable member rotatably sleeved on the pivot shaft adjacent to the second end, a pair of second magnets fixed in the rotatable member, and a second friction member sleeved on the pivot shaft and connected to the rotatable member; the second friction member abutting the first friction member; wherein a polarity of each of the second magnets face an opposite polarity of each of the first magnets such that the first and second magnets create an attracting force, and the rotatable module is pushed to tightly contact the fixing module by the attracting force such that a friction is created between the rotatable module and the fixing module to hold the rotatable module; and
    a fixing member fixed at the second end of the pivot shaft to prevent the rotatable module from detaching from the pivot shaft.

12. The hinge assembly of claim 11, wherein the fixing member defines a receiving hole and two latching protrusions are formed in an inner surface of the receiving hole; the first magnets are latched in the receiving hole by the latching protrusions.

13. The hinge assembly of claim 12, wherein the fixing member comprises a connecting portion having a connecting surface abutting the first friction member; the receiving hole is defined in the connecting surface and extends into the connecting portion; the fixing member further defines two fixing grooves in the connecting surface adjacent to the receiving hole; the first friction member is a tab washer including a main portion and two tabs formed at an edge of the main portion; the tabs are received in the fixing grooves of the fixing member so that the first friction member is fixed to the fixing member.

14. The hinge assembly of claim 13, wherein the connecting portion further comprises a resisting surface opposite to the connecting surface; the resisting surface defines a non-circular engaging hole extending into the connecting portion and communicating with the receiving hole; the pivot shaft comprises a limiting portion adjacent to the first end; the limiting portion tightly engages in the engaging hole to prevent the fixing member from detaching from the pivot shaft.

15. The hinge assembly of claim 11, wherein the rotatable member defines a receiving hole and two latching protrusions are formed in an inner surface of the receiving hole; the second magnets are latched in the receiving hole by the latching protrusions.

16. The hinge assembly of claim 15, wherein the rotatable member comprises a connecting portion having a connecting surface abutting the second friction member; the receiving hole is defined in the connecting surface and extends into the connecting portion; the rotatable member further defines two fixing grooves in the connecting surface adjacent to the receiving hole; the second friction member is a tab washer including a main portion and two tabs formed at an edge of the main portion; the tabs are received in the fixing grooves of the rotatable member so that the second friction member is fixed to the rotatable member.

17. The hinge assembly of claim 16, wherein the connecting portion further comprises a resisting surface opposite to the connecting surface; the resisting surface defines a substantially circular engaging hole extending into the connecting portion and communicating with the receiving hole, the second end of the pivot shaft rotatably extends through the engaging hole; the pivot shaft defines a latching groove around the second end of the shaft portion; the fixing member is a C-shaped snap ring latched in the latching groove of the pivot shaft.

18. The hinge assembly of claim 11, wherein the first and second friction members are made of high carbon steel; the first and second magnets are both permanent magnets.

* * * * *